March 20, 1928.                                                            1,662,965
E. S. ENSIGN
CONTROL SYSTEM FOR REFRIGERATING APPARATUS
Filed March 31, 1926                4 Sheets-Sheet 1

Inventor
Emory S. Ensign
By Roberts, Cushman + Woodbury
Att'ys

March 20, 1928.  1,662,965
E. S. ENSIGN
CONTROL SYSTEM FOR REFRIGERATING APPARATUS
Filed March 31, 1926  4 Sheets-Sheet 2

Inventor
Emory S. Ensign

March 20, 1928.  1,662,965

E. S. ENSIGN

CONTROL SYSTEM FOR REFRIGERATING APPARATUS

Filed March 31, 1926  4 Sheets-Sheet 3

Inventor
Emory S. Ensign
by Roberts, Cushman & Woodberry
Att'ys

March 20, 1928.  1,662,965

E. S. ENSIGN

CONTROL SYSTEM FOR REFRIGERATING APPARATUS

Filed March 31, 1926  4 Sheets-Sheet 4

Inventor
Emory S. Ensign
by Roberts, Cushman & Woodbury
Att'ys

Patented Mar. 20, 1928.

1,662,965

UNITED STATES PATENT OFFICE.

EMORY S. ENSIGN, OF NEW HAVEN, CONNECTICUT, ASSIGNOR TO NATIONAL REFRIGERATING COMPANY, OF NEW HAVEN, CONNECTICUT, A CORPORATION OF MASSACHUSETTS.

CONTROL SYSTEM FOR REFRIGERATING APPARATUS.

Application filed March 31, 1926. Serial No. 98,732.

My invention relates to automatic control of refrigerating apparatus of the absorption type in which condensation of refrigerant material and evaporation thereof in the refrigeration department constitute alternating stages of the operating cycle. The main object in view is to provide a system of control which, applied to refrigerating apparatus of the type designated, and used under conditions which preclude attention and operation by trained persons, will with substantial completeness automatically regulate such apparatus in response to fluctuating conditions either internal or external to the apparatus and maintain it in regularly satisfactory and efficient operation, in spite of such fluctuations. Domestic refrigerators and small commercial apparatus are especially in need of such adequate automatic control; their requirements for control vary widely with geographical situation, with individual demands for service, and with the personal equation of the user. Control systems involving my invention may under some conditions be adequate in relatively simple form and with a minimum of control-factor, while under other conditions they may require supplemental operative factors of organization which afford greater flexibility and refinement, greater resourcefulness and adaptability to meet and cope with emergent variables of environment.

In the drawings hereto annexed, which illustrate a preferred form of my invention.

Figure 1:
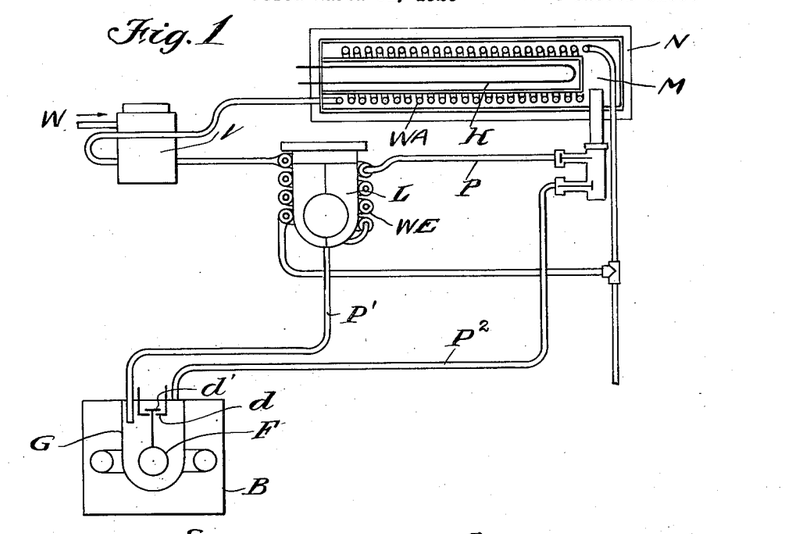
Fig. 1 is a diagrammatic representation of the principal factors of a refrigerating apparatus of my preferred form.

In carrying out my invention as herein shown, I employ as in Fig. 1 a given mass M of absorbent material in the container N, which latter, with the condenser WE, a float chamber L, collecting chamber G, and connections P, $P^1$, $P^2$ form a closed system. In this diagram, be it noted, adjuncts such as check valves, details of heat distribution, electric wiring connections and switches, etc., are omitted.

The source of heat to be imparted to material M in order to cause emission therefrom of absorbed refrigerant is conventionally represented by an electric heating coil H, the means for abstracting heat from the absorbent material to promote reabsorption of refrigerant may be a water circulation coil WA.

L represents a float chamber, and WE a water circulation coil for abstracting heat from refrigerant emitted from M and conducted through the pipe P; a two way valve V serves to direct water one way or the other from source W; G represents a collecting chamber for condensed liquid refrigerant conducted from the float chamber through pipe $P^1$; B represents a container for a refrigerated body, such as brine. F represents a float, and d, d' an electric contact or circuit closure, adapted to function in response to depletion of the refrigerant to a predetermined minimum in the collecting chamber G. The factor represented or illustrated by this float and electric devices will be described in connection with Figs. 4 and 5, and may be ignored in connection with Figs. 2 and 3.

For example, assume that the material M is a given quantity of calcium chloride, saturated with ammonia to the condition represented by $CaCl_2 8NH_3$ and that the amount of ammonia emitted by and reabsorbed in this material is to be the quantity represented by the change from the stated maximum absorption to the condition of the material represented by $CaCl_2 4NH_3$. With the materials taken for example, this range of operation can not be substantially exceeded without impairing the efficiency of the apparatus.

With these data, and with a dependable normal rate of heat input by the heating factor H, it is obvious that, starting with an assumed initial temperature of the fully charged material M, a given time will elapse, at the close of which substantially all the material will have reached the condition represented by $CaCl_2 4NH_3$, and that, with an appropriately designed condenser WE cooled by a cooling medium (e. g. water, through coil WE) at a rate corresponding to the rate and temperature of emission, the refrigerant—ammonia—will be cooled below its liquefying temperature at the pressure produced in the closed system by the input of heat and thus liquefied, and that this condensed refrigerant will collect in the chamber G.

One way of controlling the duration of the emission stage in apparatus of this character has heretofore been by the accumulation of liquid refrigerant in the collecting chamber, in such manner that the input of heat to the absorbent-generative material shall continue (the condenser operation also) until the predetermined maximum quantity of refrigerant material has been emitted from the absorbent and collected in the collecting chamber. If the supply of heat for emission purposes be steady and reliable, the time required for emission and collection of refrigerant material is substantially constant; but in fact there are many situations where constant heat-service is not maintained and, if the rate of heat input falls substantially, the protraction of the emission stage in an apparatus controlled by liquid-refrigerant level will be such that the temperature in the chambers served by the apparatus will rise unduly, as for instance to a degree to permit defrosting or melting of the frosted moisture upon the outer surface of container B.

Figure 2:
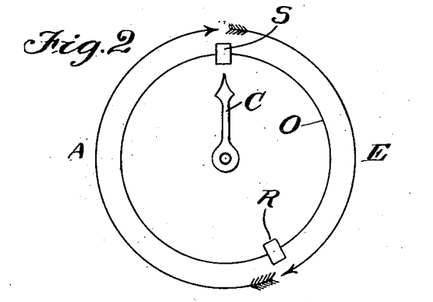
Fig. 2 is a diagram representing a chronometric control for an apparatus of the said type, in its simplest aspect; this represents, for a basis of demonstration, a type of chronometric control heretofore suggested.

For reasons and purposes thus indicated, chronometric control has been proposed as a substitute for control dependent wholly upon selected limits of variant factors, either obtaining in the refrigerating apparatus or in the refrigerated apparatus, or both—as for instance control by maximum and minimum of condensed refrigerant; such external chronometric control, in its simplest aspect, is diagrammatically illustrated by Fig. 2.

C represents a moving member of any instrument serviceable as a chronometer. This term, be it understood, is here used in its etymological sense. The chronometer, in this association may or may not be regular in its progress throughout the entire cycle in which it moves; it is essential only that in movement between certain selected stations in the cycle it shall always normally require the same time interval.

The circle O graphically symbolizes the complete cycle. Assume now that the material M (Fig. 1) is fully charged with its predetermined maximum content of refrigerant material, and that therefore it is in order for the emission stage of the refrigerative cycle to begin, and that the controlling member C of the chronometer, being at or just passing station S, by any means conceivable, be it mechanical, electro-mechanical, or what one pleases, initiates heat input to material M, and directs a cooling medium (as by valve V) through the condenser coil WE, and that these conditions will persist in the apparatus indicated in Fig. 1 until an appropriate factor intervenes to interrupt. At station R, (Fig. 2) on the circle representative of the chronometer course or cycle, means are provided which are stimulated to action when the controlling member reaches or is passing the said station, their action, through any train of operative factors being effective to interrupt heat input to the material M, and also to set into operation means for abstracting heat from the said material, to reduce its temperature. This latter will as usual in such apparatus, be accomplished by turning the flow of cooling water, by way of valve V, from the condenser coil WE and into the cooling coil WA.

With respect especially to the service efficiency of the heat source, the emission interval E, measured by the time required for the chronometric control C to advance from station S to station R is so adjusted (as by determining the location on circle O of these two stations) that, when the heat input is at its expected value, the predetermined quantity of refrigerant material will have been emitted when the control member C arrives at station R and causes the characteristic reversal of the refrigeration cycle, from emission stage to absorption stage.

It will now be apparent, that if the heat service rate falls below normal, the time elapsed in progress of the control member from station S to station R will not suffice for emission from material M of the normal quantity of refrigerant, but that although the material M has not been exhausted of full normal emitted quantity, the emission stage of the cycle will nevertheless be interrupted, arbitrarily so to speak, and reabsorption, with accompanying refrigeration, will begin, and undesirable rise of temperature, such as to cause melting of the accumulated frost on the brine tank B, will not be permitted during the heating stage of the cycle. Nevertheless, a rigidly predetermined chronometric control such as is illustrated in Fig. 2 can not be expected to remain in phase, so to speak, with the alternating emission and absorption phases of the refrigerating apparatus.

A chronometric control of the simple character illustrated by Fig. 2 possesses also, and apart from its more fundamental deficiency, just above mentioned, a defect on the score of economy, in that it provides for abstraction of heat (as by circulation of water) from the absorbent material to begin simultaneously with cessation of heat input, and thus waste energy stored in the material itself and the structure with which it is associated, as well as raising the temperature of the cooling water so that high pressure steam is produced for several minutes with resulting objectionable noise in the water pipes. The control apparatus diagrammatically illustrated in Fig. 3 comprises provisions for eliminating waste from this cause. Instead of the single station R, equipped with means for abrupt transition from the emission stage to the absorption stage of the refrigeration cycle, two control stations R' and R² are provided, station R' being equipped with means whereby, when the chronometer control member C reaches or is passing it, the input of heat energy of the material M is stopped, leaving cooling coil WE in operation.

After a predetermined interval, when the control member C reaches or is passing station R², means associated with that station, and actuated by the chronometric control, initiates heat abstraction from the material M, as by diverting a stream of water from coil WE to coil WA, by action of the valve V. The time interval represented by the distance E' between stations R' and R² will be calculated and fixed so that heat stored in the generating department of the apparatus of Fig. 1 during the stage represented by the distance E will continue to produce emission of refrigerant until the temperature of the material M is reduced to that degree at which, under the internal conditions of the apparatus, emission practically ceases, or substantially to the boiling point of water. Especially toward the beginning of this period, the material M is cooled substantially as much by the evaporation of the emitted refrigerant as it would be by the immediate diversion of cooling water to the generator. The position of the double or "split action" reversing station R', R², with relation to the emission stage starting station S will be determined with reference to the desired normal output of refrigerant, for instance, that represented by change of calcium chloride ammonia compound from the condition represented by $CaCl_2.8NH_3$ to that represented by $CaCl_2.4NH_3$.

Figure 3:
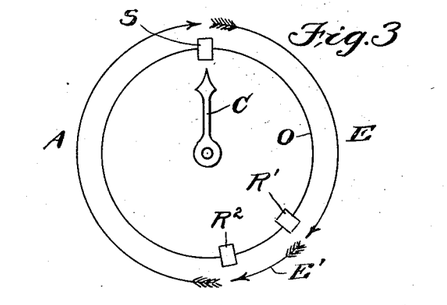
Fig. 3 is a diagram, similar in scheme to Fig. 2 representing the rudimentary chronometric control with one factor modified.

Chronometric control, with stage alternations of the refrigerating cycle at fixed time intervals, such as illustrated by Figs. 2 and 3, when exactly adjusted to the normal performance of a given refrigerating apparatus and the refrigerator served by it, may prove tolerably reliable and serviceable provided the conditions under which the whole apparatus is operated are absolutely steady. Since, however, steadiness both of service load and rate of heat input and abstraction is rather the exception than the rule, and can hardly be expected at all in the performance of domestic refrigeration plants, a greater flexibility and adaptability to variant conditions is always to be desired and often indispensable in the control apparatus.

Figure 4:
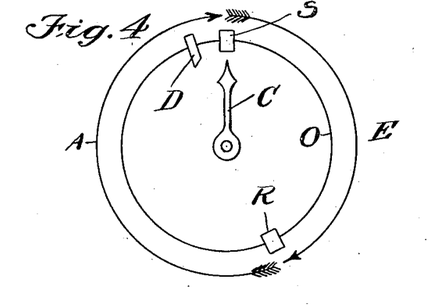
Fig. 4 is another diagram, similar in scheme, representing the chronometric control with a supplemental factor introduced.
Figure 5:
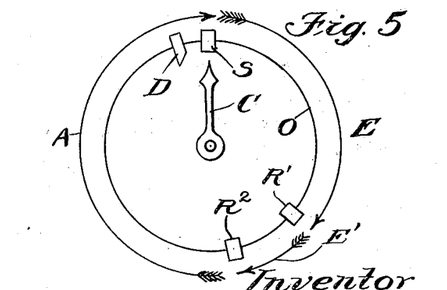
Fig. 5 is another diagram, similar in scheme, representing the chronometric control with the characteristics of both Fig. 3 and Fig. 4 included.
Figure 6:
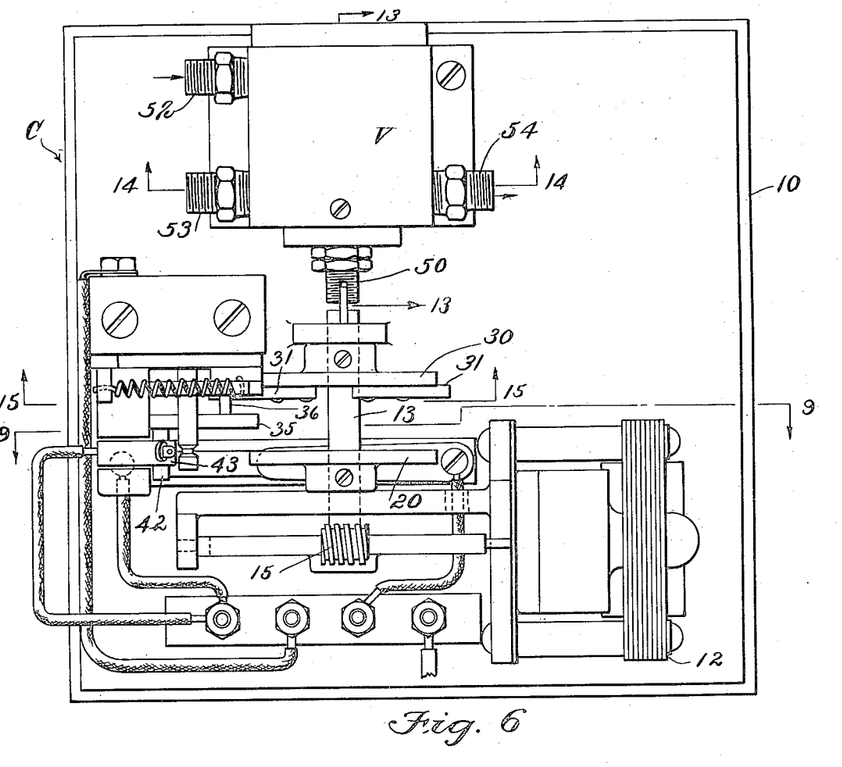
Fig. 6 is a plan view of the preferred form of control apparatus.
Figure 7:
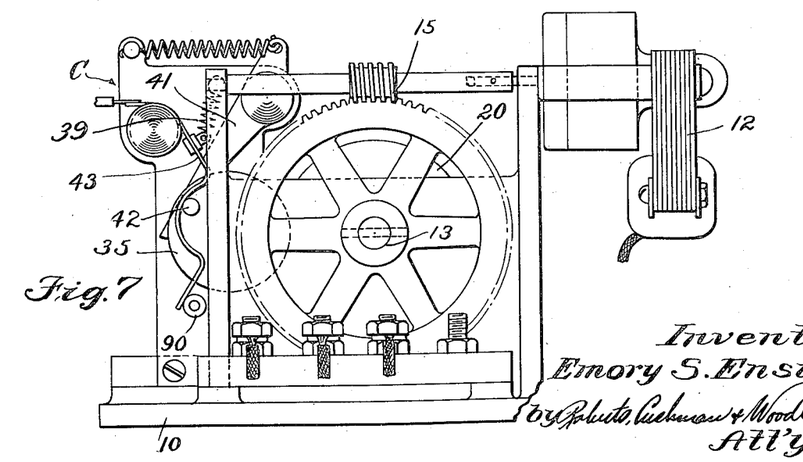
Fig. 7 is a side elevation of the same.
Figure 8:
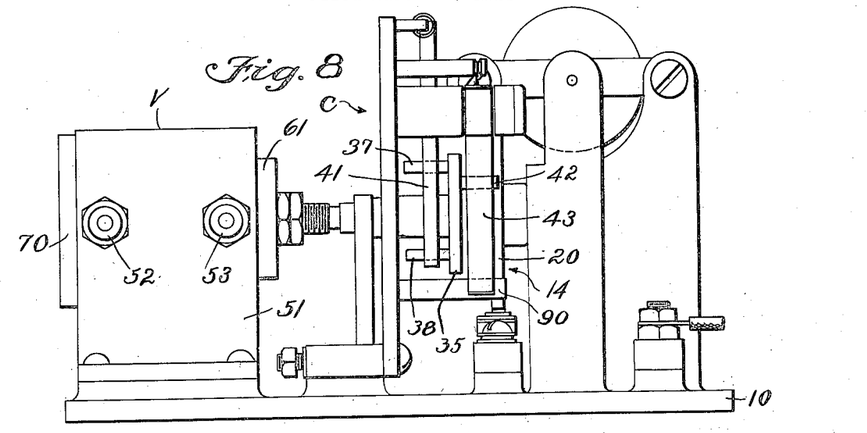
Fig. 8 is a front elevation of the same.

Wide variations in conditions affecting refrigerator service, whether seasonal or diurnal, internal or external, regular or irregular in interval, require compensation. The chronometric control apparatus should for this purpose be subject to control reciprocally exerted upon it by the refrigeration apparatus. Figures 4 and 5 illustrate diagrammatically the mode in which such modification of chronometric control is affected. These two diagrams may be considered together, since they differ in detail solely in that Fig. 4 shows a single reversal control station R (like Fig. 2) whereas Fig. 5 shows the double or split control reversal station $R^1$, $R^2$ (like Fig. 3).

The time and space factors of the chronometric control are primarily adjusted so that the period required for progress of the control member—represented by C—from the stage reversal station (R of Fig. 4 or R² of Fig. 5) to the stage reversal station S under normal conditions will terminate in synchrony with the reabsorption of an amount of refrigerant equal to that emitted and condensed during the emission cycle, this representing the predetermined full charge of the collecting chamber G when the refrigerator itself is making its maximum service demand. With such an adjustment it is manifest that during periods of reduced or minimum service demand, the chronometric control members would arrive at the reversal station S and initiate the emission stage of the refrigerating cycle before the full charge of refrigerant material previously collected by condensation has been evaporated and reabsorbed. To afford time for complete evaporation and reabsorption under all service conditions, some means for interrupting or delaying the progress of the chronometric control factor during the evaporation and absorption stage of the refrigeration cycle, is to be provided. This is represented in the diagrams Figs. 4 and 5 by D, which I designate the detent. The detent might be a physical obstacle, or means operated by the chronometric control apparatus itself for interrupting its own driving power, or what one pleases, provided it be operative to postpone the action of the cycle-reversing instrumentalities associated with station S and stimulated to action by the chronometric control.

Referring now to Fig. 1 there is represented, as illustrative of means dependent for action upon the exhaustion to a predetermined extent of the liquid ammonia in the collecting chamber G, a ball float F, to which is connected an electric circuit closure device $d'$ which, when the liquefied refrigerant material in the chamber G is exhausted to a predetermined extent closes an electric circuit $d$, and, actuated by its closure, the detent D is withdrawn from its position in the path of the chronometric control member, and the latter takes up its interrupted progress and proceeds to station S, there to set in action the train of instrumentalities provided for initiation of the emission stage of the refrigeration cycle. Thus the absorption period, indicated by the curved arrow A in Figs. 4 and 5 will be longer or shorter, as conditions demand. The refrigeration apparatus primarily under the control of the chronometric apparatus, exerts a secondary reciprocal control on the chronometric apparatus, retarding or arresting its normal progress to suit variations in external conditions.

In practice the parts will be so adjusted that, even under the extreme maximum of service demand to be expected, the point D will be reached by the arm C before the liquid ammonia in the chamber G is sufficiently exhausted to permit the electric closure device $d'$ to operate.

Figures 15, 16:
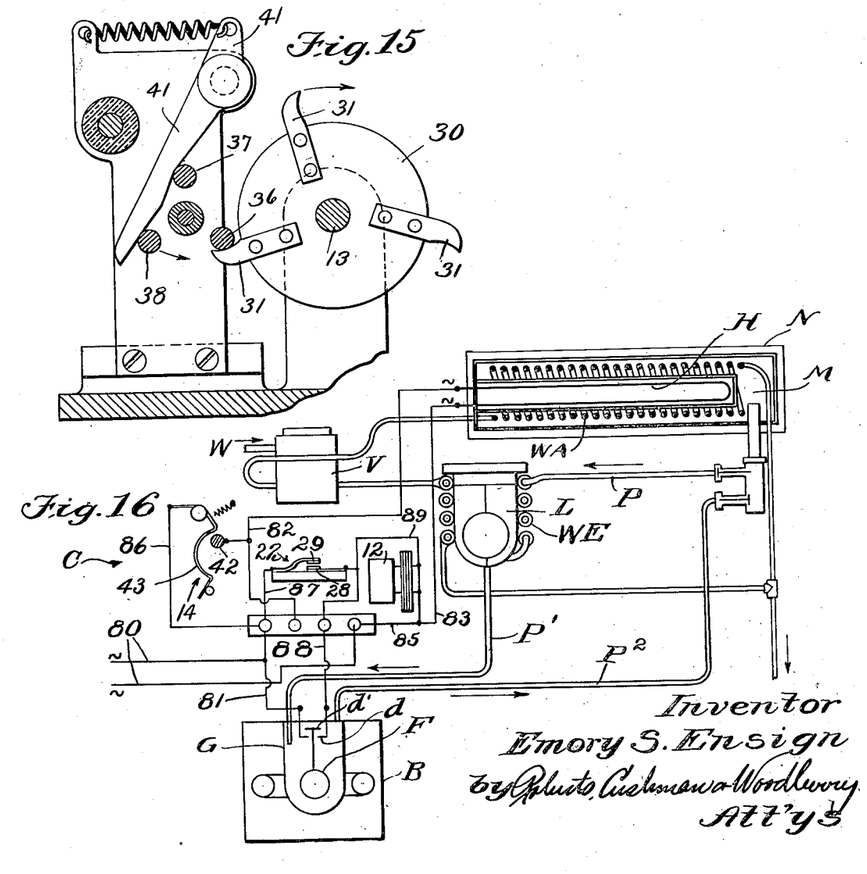
Fig. 15 is a section on line 15—15 of Fig. 6.
Fig. 16 is a diagrammatic representation of the control and refrigerating apparatus showing electrical connections for the same.

A chronometric control apparatus embodying in full detail one specific expression of the principles of structure and operation broadly illustrated in Figs. 1 to 5 inclusive, is shown in Figs. 6 to 15 and diagrammatically illustrated in relation to the principal factors of the refrigerating apparatus by Fig. 16.

The control apparatus designated generally by the symbol C comprises in its more essential aspects an electrically actuated chronometer 12, a control member 13 adapted to open and close a switch 14 which controls the heater H, also to actuate the valve V in order to change the direction of liquid flow and being further adapted to operate a switch 22, thus cutting out the chronometer circuit in order to permit a secondary control factor to be impressed upon the chronometer by the refrigerating apparatus.

The chronometer 12, the control member 13, switches 14 and 22 and valve V are conveniently disposed in a unitary assembly upon a common base panel 10; the latter having suitably disposed supporting flanges and brackets for the various elements mounted thereon, as shown. Chronometer 12 preferably receives electric energy through leads 85 and 89 (Fig. 16) and operates the control member or shaft 13 through suitable gearing 15, preferably rotating the latter one revolution during each complete refrigerating cycle.

Fixed upon member 13 is the switch actuating element 30 which may be conveniently supplied with substantially radially disposed arms 31, preferably of fibrous insulating material. Mounted upon an axis parallel to that of shaft 13 is a rotatable disk 35 upon one face of which are disposed outstanding parallel pins 36, 37 and 38 which may be successively actuated by the respective arms 31 of member 30, thereby causing rotary movement to be imparted to member 35. A suitable spring controlled detent 41 is adapted successively to engage adjoining pairs of pins 36, 37 and 38, whereby member 35 may be intermittently rotated and retained in successive fixed positions. Upon the other face of member 35 is a single outstanding pin 42 which is adapted to be engaged with an irregularly shaped strip 43, in one or the other of the fixed positions of disk 35, as for example while detent 41 engages pins 37 and 38. Strip 43 is resiliently held by a spring 39 against an insulated stop 90, or against the pin 42. Pin 42 and the strip together form a snap switch and are adapted to close an electric circuit through leads 82, 83, 85, 80 and 86 to energize heater H.

Control member 13 is connected to the aligned shaft 50 of the two way valve V which is illustrated more specifically in Figs. 10 to 14. The valve preferably comprises a hollow block 51 which forms a casing having the inlet pipe 52 to permit entrance of the water and having the outlet pipes 53 and 54, through one or the other of which the water is alternately permitted to leave the valve.

Figure 10:
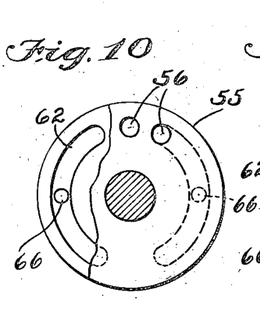
Fig. 10 is a detail elevation with a part broken away.
Figures 11, 12:
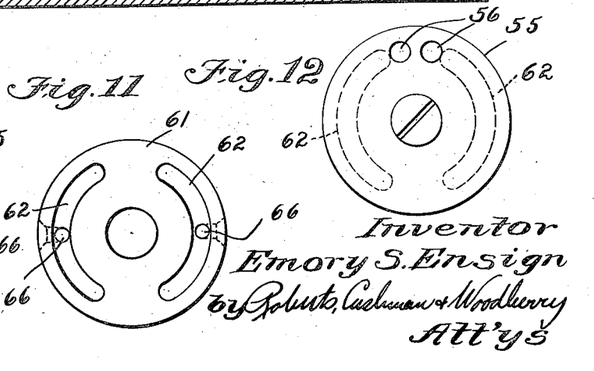
Figs. 11 and 12 are detail elevational views.
Figure 13:
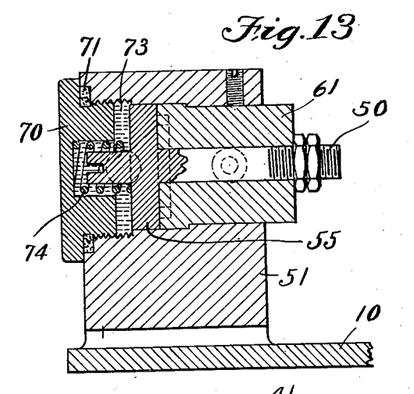
Fig. 13 is a section on line 13—13 of Fig. 6.
Figure 14:
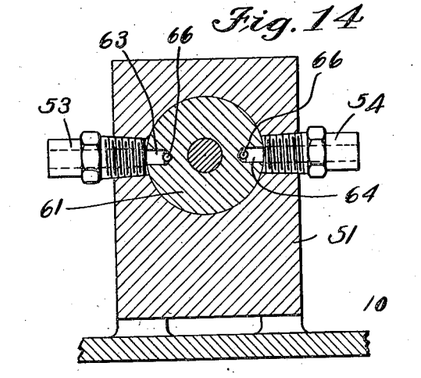
Fig. 14 is a section on line 14—14 of Fig. 6.

Fixed upon the end of shaft 50 or integral therewith is a disk 55 which is shown in Figs. 10 and 12. Block 51 is provided with a removable annular member 61 forming a bearing for the shaft 50 and having its inner face in close engagement with valve disk 55 which is integral with or fixed upon the shaft. This disk is provided with two juxtaposed ports 56 which are adapted successively to register with two segmental grooves 62 upon the adjoining face of member 61 as shaft 50 is rotated. Connected with the intermediate portions of these grooves are longitudinally disposed conduits 66 in the member 61 which, in turn, are connected with the passages 63 and 64 registering with the oppositely disposed outlet pipes 53 and 54 respectively. A cap 70 is threaded into block 51 adjoining the other face of disk 55, these elements forming a suitable chamber 73 connected to the water inlet pipe 52. Water may thus pass through ports 56 to one or the other of the segmental grooves 62, the corresponding longitudinal conduit 66 and outlet pipe 53 or 54.

In order to retain disk 55 in comparatively tight engagement with the annular member 61, a suitable coil spring 74 may be inserted in a recess in cap 70 with its end engaging disk 55 to hold that member firmly against block 61, while packing 71 is interposed between cap 70 and the block 51 for a similar purpose. The fact that members 55 and 61 are easily removable permits the ready provision and maintainance of a water-tight fit therebetween.

It is to be understood that the segmental grooves 62 and ports 56 in the valve V are preferably dimensioned and disposed so that just as water flow is ceasing through one outlet it is starting in the other, with the result that either the absorbent material M or the condenser is being cooled. The switch 14 is synchronized with the valve so that there may be a definite period between the opening of the switch and the directing of the water flow through pipe 53 to material M, thereby increasing the thermal efficiency of the device or providing a double reversing station $R^1 R^2$ as diagrammatically illustrated in Figs. 3 and 5.

Figure 9:
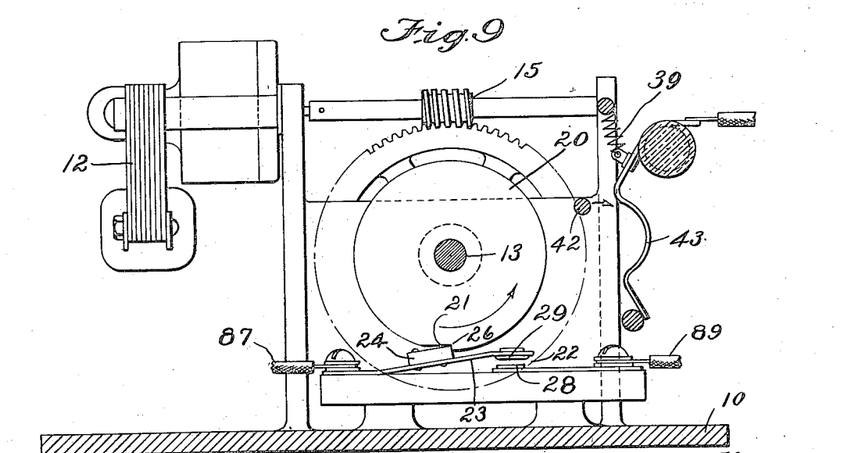
Fig. 9 is a section on line 9—9 of Fig. 6.

Switch mechanism 21, which is designed to permit the regulation of the apparatus by a secondary control factor, comprises a cam disk 20 mounted on member 13 with a notch 26 at one point in its periphery. Adjoining the disk is disposed a suitable switch 22 comprising a fixed contact 28 and a movable contact 29 at the end of a spring leaf 23 which resiliently retains a block of insulating material 24 in engagement with the notched periphery of cam disk 20. The switch and disk are so arranged in relation to each other that the block 24 engaging the periphery of the disk normally holds contact 29 against contact 28, except when the block is engaged in notch 26 at one point in the revolution of the disk, when the circuit will automatically be opened (Fig. 9). Switch 22 is located between leads 89 and 87 (Fig. 16) and therefore its opening is adapted to suspend action of the chronometer, until or unless the switch $d'$, $d$ which is located in parallel with switch 22 is closed.

Referring more particularly to Fig. 16, it may be seen that the chronometer may be energized either through leads 80, 87, 89; and 85, when switch 22 is closed, or through leads 80, 81, 88, 89 and 85 when switch $d'$ $d$ is closed. As previously described the last named switch is controlled by the float F, the position of which is determined by the level of the refrigerant in collecting chamber G. Ordinarily the control apparatus will be so designed that switch 22 will be opened approximately at the time switch $d'$, $d$ is being closed under the most severe operating conditions, or, in other words, under practically all working conditions there will be some lapse of time when both of the above described chronometer circuits will be open. The typical refrigerating cycle will therefore comprise a period of definite length chronometrically controlled, at the end of which period may occur an interval of variable length in accordance with control imposed by the refrigerating apparatus and automatically variant in response to conditions therein, thereby completing the cycle.

When movement of control member 13 is resumed due to the closing of switch $d'$ $d$, the inclined surface of the notch will permit the gradual return of contact 29 to its closed position, whereupon chronometer 12 may receive electric current through both of the parallel parts of its circuit, until subsequent change in the level of refrigerant in chamber G opens switch $d'$ $d$, permitting the full amount of current to pass through switch 22.

It is now evident that I have provided automatic means whereby the cycles of an apparatus such as a refrigerating device of the absorption type may be controlled by a chronometer but whereby the action of that chronometer which is designed to control fixed parts of the cycle may be delayed in response to reciprocal regulation afforded by the refrigerating device to compensate for variations in working conditions, and whereby the apparatus may have a degree of variable control to compensate for variant internal or external conditions. It may be further seen that the direction of flow of the cooling agent such as water may be automatically controlled in synchrony with the operation of the chronometer so that a definite period of time may elapse between the heat input and abstraction of heat provided for the absorbent material, whereby not only the economy of operation is enhanced, but the cooling effect of the evaporating refrigerant rather than cooling water serves to lower the temperature of the absorbent material to a point where water may be diverted through the generator without generation of steam and consequent undesirable noise.

I claim:

1. The combination, with absorption refrigeration apparatus of the character designated, of a chronometric control member, means arranged to be successively stimulated by the said control member to initiate and terminate in alternation the emission and absorption stages of the cycle of said refrigeration apparatus, means adapted to delay progress of said chronometric control member near the close of the absorption stage, and means responsive to exhaustion of the condensed refrigerant, whereby said chronometric control member is made free to progress normally.

2. The combination, with absorption refrigeration apparatus of the character designated, of a chronometric control member, means arranged to be successively and cyclically stimulated by said control member, to wit: means to initiate heat input to charged absorbent material, means to terminate said heat input, and means to initiate heat abstraction from said absorbent material, means adapted to delay progress of said chronometric control member near the close of the absorption stage, and means responsive to exhaustion of the condensed refrigerant whereby said chronometric control member is made free to progress normally.

3. The combination, with absorption refrigeration apparatus of the character designated, of a movable chronometric control member, means arranged to be successively stimulated by said control member to initiate and terminate in alternate succession the emission and absorption stages of the cycle of said refrigeration apparatus, and means adapted to delay progress of the control member at a portion of its path corresponding to one part of the cycle, and a second control factor adapted to terminate the period of delay, said factor being actuable by the refrigeration apparatus whereby the period of delay may be varied in length in accordance with variant conditions to which that apparatus is subjected.

4. The subject matter of claim 3 further characterized in that the chronometric control member is operated by energy received through an electric circuit and in that the means adapted to delay progress of the control member comprises an electric switch operated by the control member at one point of its path to open said circuit, said switch comprising a fixed contact and a yieldably mounted contact, means operated by the control member normally holding the contacts together but permitting their separation at the portion of the cycle during which the period of delay occurs.

5. The subject matter of claim 3 further characterized in that the chronometric control member is operated by energy received through an electric circuit, and in that the means adapted to delay progress of the control member comprises an electric switch operated by the control member at one point of its path to open said circuit, and that the means adapted to terminate the period of delay comprises a second switch in a portion of the circuit parallel to the first switch, whereby closing of the second switch starts the movement of the chronometer and the control member, said second named switch comprising a fixed contact and a movable contact, said movable contact, being connected to a float in the refrigerating apparatus, whereby the switch may be closed when the level of liquid refrigerant is lowered.

6. The subject matter of claim 3 further characterized in that the chronometer is operated by energy received through an electric circuit and in that the means adapted to delay progress of the control member comprises an electric switch operated by the control member at one point of its path to open said circuit to permit regulation by a secondary control factor, said secondary control factor being adapted to cause closing of said electric switch after a period of delay of variable length, whereby continued operation of the chronometer through said switch and circuit may continue.

7. The subject mater of claim 3 further characterized in that the chronometric control member is operated by energy received through an electric circuit and in that the means adapted to delay progress of the control member comprises an electric switch operated by the control member at one point of its path to open said circuit, and that the means adapted to terminate the period of delay comprises a second switch in a portion of the circuit parallel to the first switch, whereby closing of the second switch starts the movement of the chronometer and the control member.

8. The subject matter of claim 3 further characterized in that the chronometer is operable by energy received through an electric circuit, said circuit being adapted to be closed when either one of a pair of parallel switches is closed, means adapted to hold one switch closed except at the portion of the path of the control member corresponding to the period of delay and means controlled by the refrigerating apparatus to close the other switch at the end of the period of delay to restart the chronometer, said last named means being adapted to maintain the circuit closed until the first switch is automatically closed to complete the cycle.

9. The combination, with absorption refrigeration apparatus of the character designated, of a chronometric control device, means arranged to be successively stimulated by said control device to initiate and terminate in alternate succession the emission and absorption stages of the cycle of said refrigeration apparatus, including means to apply heat to the absorbent and to abstract heat from the same, whereby refrigerant is emitted and absorbed, said control device being actuable in response to a chronomertic control factor, and being further actuable in response to a secondary control factor during one portion of its cycle, said secondary control factor being arranged to provide an interval of delay between said heat application and abstraction stages, said interval occurring in the portion of the cycle wherein the apparatus is controlled by the chronometric control factor, whereby the interval is of a definite predetermined length.

10. The combination, with absorption refrigeration apparatus of the character designated, of a chronometric control member, means arranged to be successively stimulated by said control member to initiate and terminate in alternate succession the emission and absorption stages of the cycle of said refrigeration apparatus, including means for the application of heat to the absorbent and for abstraction of heat from the same, whereby refrigerant is emitted and absorbed, said control apparatus being adapted to provide an interval of delay between heat application and abstraction periods, and means adapted to delay progress of said chronometric control member near the close of the absorption stage, and means responsive to the refrigerating apparatus whereby the control member may proceed normally after the last named period of delay.

Signed by me at New Haven, Connecticut, this 27th day of March, 1926.

EMORY S. ENSIGN.